United States Patent
Rao (10) Patent No.: US 10,491,406 B2
(45) Date of Patent: *Nov. 26, 2019

(54) AUTOMATIC ELEVATION OF SYSTEM SECURITY

(71) Applicant: EMC Corporation, Hopkinton, MA (US)

(72) Inventor: Raghavendra Anantha Rao, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,012

(22) Filed: Sep. 6, 2018

(65) Prior Publication Data

US 2019/0007221 A1  Jan. 3, 2019

Related U.S. Application Data

(63) Continuation of application No. 15/495,778, filed on Apr. 24, 2017, now Pat. No. 10,097,359, which is a
(Continued)

(51) Int. Cl.
*H04L 9/32* (2006.01)
*H04L 29/06* (2006.01)
(Continued)

(52) U.S. Cl.
CPC .............. *H04L 9/3263* (2013.01); *H04L 9/16* (2013.01); *H04L 9/302* (2013.01);
(Continued)

(58) Field of Classification Search
CPC . H04L 9/3263; H04L 65/1069; H04L 63/105; H04L 9/302; H04L 67/10; H04L 9/16; H04L 63/168; H04L 63/0823
See application file for complete search history.

(56) References Cited

U.S. PATENT DOCUMENTS 7,627,893 B2 * 12/2009 Corley .................... G06F 21/53
709/223
7,788,702 B1   8/2010 Harris
(Continued)

OTHER PUBLICATIONS

Hayes, J.M., "Secure In-band Update of Trusted Certificates", 1999, Proceedings, IEEE 8th International Workshops on Enabling Technologies: Infrastructure fo Collaborative Enterprises (WET ICE'99), pp. 168-173. (Year: 1999).*

*Primary Examiner* — Matthew Smithers
(74) *Attorney, Agent, or Firm* — Van Pelt, Yi & James LLP (57) ABSTRACT

A system for automatic setting of system security comprises an input interface and a processor. The input interface is configured to receive an indication to set a secure mode. The processor is configured to: determine whether the indication to set the secure mode comprises an indication to set a certificate mode; in the event that the indication to set the secure mode comprises an indication to set a certificate mode: 1) detect one or more connected systems for which to set the certificate mode; 2) select one or more certificates for the certificate mode; 3) update initialization files for the certificate mode; and 4) reinitialize local and one or more connected systems.

18 Claims, 12 Drawing Sheets

Related U.S. Application Data continuation of application No. 14/704,759, filed on May 5, 2015, now Pat. No. 9,667,617, which is a continuation of application No. 14/034,239, filed on Sep. 23, 2013, now Pat. No. 9,055,057.

(51) Int. Cl.
  *H04L 29/08* (2006.01)
  *H04L 9/16* (2006.01)
  *H04L 9/30* (2006.01)

(52) U.S. Cl.
  CPC ........ *H04L 63/0823* (2013.01); *H04L 63/105* (2013.01); *H04L 63/168* (2013.01); *H04L 65/1069* (2013.01); *H04L 67/10* (2013.01)

(56) References Cited

U.S. PATENT DOCUMENTS

| | | | |
|---|---|---|---|
| 8,527,764 B2 | 9/2013 | Kiran | |
| 9,055,057 B1 * | 6/2015 | Rao | H04L 63/0823 |
| 9,667,617 B2 * | 5/2017 | Rao | H04L 63/0823 |
| 10,097,359 B2 * | 10/2018 | Rao | H04L 63/0823 |
| 2004/0030885 A1 * | 2/2004 | Choi | H04W 12/0013 |
| | | | 713/150 |
| 2004/0133774 A1 | 7/2004 | Callas | |
| 2004/0268148 A1 | 12/2004 | Karjala | |
| 2005/0154795 A1 | 7/2005 | Kuz | |
| 2007/0033252 A1 | 2/2007 | Combest | |
| 2007/0039037 A1 * | 2/2007 | Son | H04L 41/0883 |
| | | | 726/2 |
| 2010/0212008 A1 * | 8/2010 | Jaganathan | G06F 21/6218 |
| | | | 726/19 |
| 2010/0217987 A1 | 8/2010 | Shevade | |
| 2011/0179473 A1 | 7/2011 | Lee | |
| 2012/0159149 A1 | 6/2012 | Martin | |
| 2013/0145165 A1 | 6/2013 | Brown | |
| 2013/0290706 A1 * | 10/2013 | Socky | G06F 21/445 |
| | | | 713/158 |
| 2014/0215580 A1 * | 7/2014 | Behringer | H04L 63/105 |
| | | | 726/5 |
| 2014/0298420 A1 * | 10/2014 | Barton | H04L 63/10 |
| | | | 726/4 |

\* cited by examiner

AUTOMATIC ELEVATION OF SYSTEM SECURITY

CROSS REFERENCE TO OTHER APPLICATIONS

This application is a continuation of co-pending U.S. patent application Ser. No. 15/495,778, entitled AUTOMATIC ELEVATION OF SYSTEM SECURITY filed Apr. 24, 2017 which is incorporated herein by reference for all purposes, which is a continuation of U.S. patent application Ser. No. 14/704,759, entitled AUTOMATIC ELEVATION OF SYSTEM SECURITY filed May 5, 2015, now U.S. Pat. No. 9,667,617, which is incorporated herein by reference for all purposes, which is a continuation of U.S. patent application Ser. No. 14/034,239, entitled AUTOMATIC ELEVATION OF SYSTEM SECURITY filed Sep. 23, 2013, now U.S. Pat. No. 9,055,057, which is incorporated herein by reference for all purposes.

BACKGROUND OF THE INVENTION

An enterprise content management system provides order to unstructured information. It manages the creation, management, processing, delivery, and archival of any content according to user-defined business rules. It establishes relationships between pieces of content, allowing the same content to be used in different contexts and renditions. It adds intelligence, creating categorization schema and metadata that make search and retrieval faster and more efficient. It automates the processing of content through its life cycle. It facilitates publication of content through multiple channels; for example, the same content can be published to a Web site, broadcasted as a fax, printed as a text document, and sent to a handheld wireless device. It promotes integration between departments and systems that previously worked within silos.

The enterprise content management system includes document repositories for storing documents, content servers for providing access to the document repositories, name servers for storing the network organization, and clients for providing system access to a user. Secure communications between the various parts of the enterprise content management system can be very important. A normal system, which uses native plain-text communication model, is very vulnerable to data leakage. There are currently no algorithm or tools or mechanism to enable a user to start using security features that are provided by the system immediately, on an as-needed basis.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic elevation of system security is disclosed. A system for automatic setting of system security comprises an interface configured to receive an indication to set a secure mode. The system for automatic setting of system security additionally comprises a processor configured to determine that the indication to set the secure mode comprises an indication to set a certificate mode, detect one or more connected systems, select one or more certificates, update initialization files, and reinitialize local and connected systems. The system for automatic elevation of system security additionally comprises a memory coupled to the processor and configured to provide the processor with instructions.

The system for automatic setting of system security automatically sets up certificate-based authentication between a server on an enterprise content management system and any other network entities in the enterprise content management system that it communicates with. Reconfiguring the system to use certificate-based authentication requires certificate based peer verification. Configuring this manually can be very error prone and time consuming. This task begins by automatically determining all systems in communication with the server. In a large enterprise content management system, even this preliminary step can be a daunting challenge for a system administrator to perform manually. The server then determines whether an authentication certificate is present for each system found to be in communication. For each system, if a certificate is not found, one is generated. The certificates are packaged into a password protected keystore file and distributed to each system in communication, as well as to the interface API on each communicating client. Each system is additionally communicated the password file. Changes are made to initialization files on each system to indicate the path to the certificate package. To complete the process of automatic setting of system security, each system is indicated to reinitialize to reflect the changes made to the initialization files.

Figure 1:
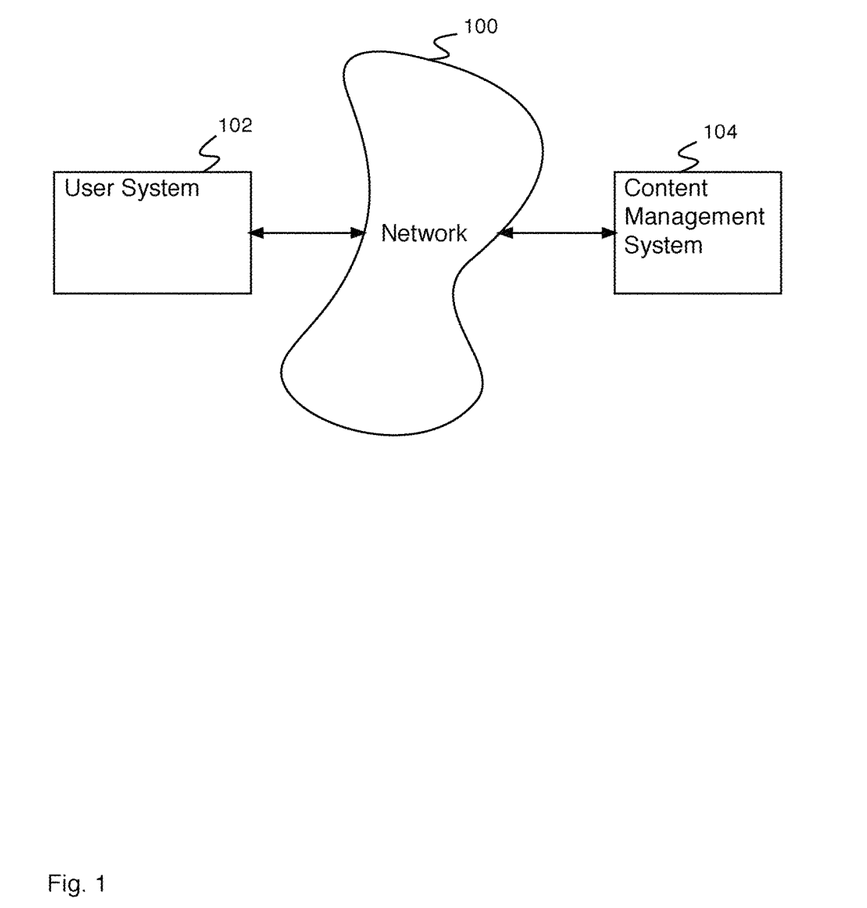
FIG. 1 is a block diagram illustrating an embodiment of a system for automatic elevation of system security.

FIG. 1 is a block diagram illustrating an embodiment of a system for automatic elevation of system security. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, user system 102 comprises a user system (e.g., a computing system for operation by a user). In various embodiments, there are 1, 6, 22, 122, 1059, or any other appropriate number of user systems communicating with network 100. In some embodiments, user system 102 comprises a system accessed by a user directly (e.g., the user is in proximity with user system 102). In some embodiments, user system 102 comprises a system accessed by a user remotely (e.g., the user is not in proximity with user system 102, and accesses user system 102 via network 100 and a separate user system). A user accessing user system 102 can access content stored by content management system 104. In various embodiments, content management system 104 comprises one or more document repository systems, content server systems, docbroker systems, or any other appropriate systems. In some embodiments, the internal operation of content management system 104 is transparent to a user accessing the system via user system 102 (e.g., the user is unaware of the configuration of repository systems, content servers, etc., forming content management system 104). In some embodiments, content management system 104 comprises a system for automatic elevation of system security.

Figure 2:
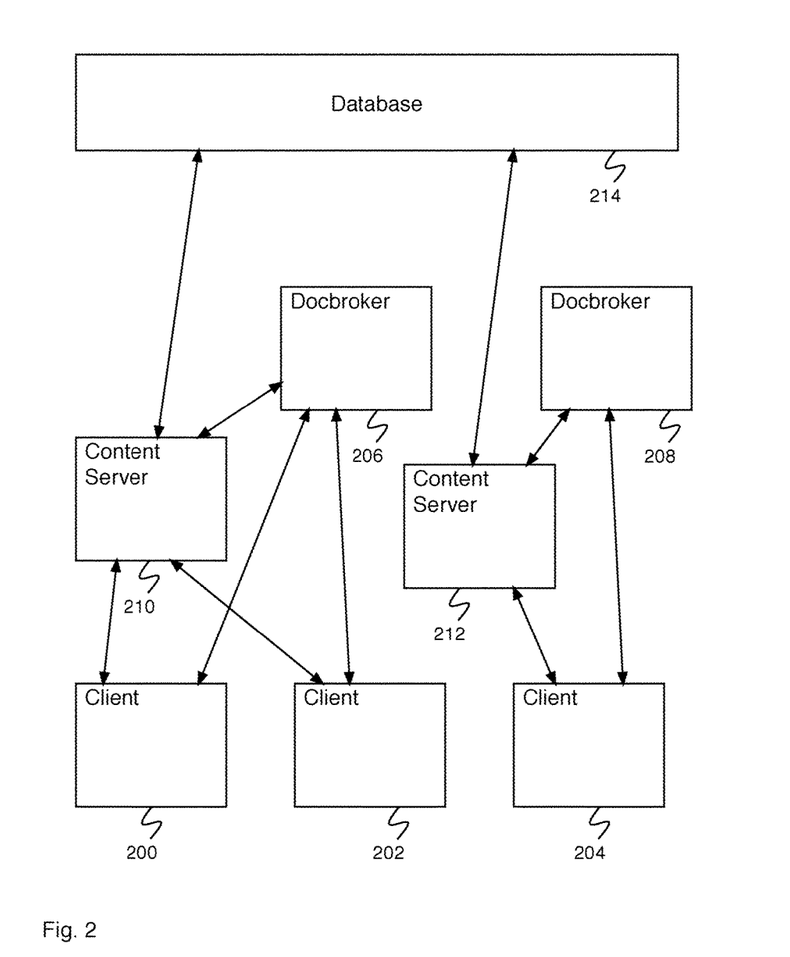
FIG. 2 is a block diagram illustrating an embodiment of an enterprise content management system and associated clients.

FIG. 2 is a block diagram illustrating an embodiment of an enterprise content management system and associated clients. In the example shown, client 200, client 202, and client 204 comprise user systems (e.g., user system 102 of FIG. 1). In some embodiments, each of client 200, client 202, and client 204 comprises interface API software for accessing a docbroker and a content server. A client stores a network address of a nearby docbroker (e.g., docbroker 206 or docbroker 208) and queries the docbroker in order to determine the network address of a content server (e.g., content server 210 or content server 212). In various embodiments, the docbroker informs the client of the nearest content server, of all content servers within a given distance, of all content servers that have access to a requested segment of data, or of any other appropriate content server. Upon receiving one or more network addresses, the client contacts a desired content server using its interface API. The interface API allows the client to make data requests to the content server that can be properly understood by the content server. The content server interprets the request and, if necessary, retrieves the data from database 214. In various embodiments, all content servers access data from a single database (e.g., database 214), there are multiple databases, there is one database for each content server, there are multiple databases for one or more content server, or there are any appropriate number of databases. In various embodiments, database data is stored in a directory structure mounted on the content server, in a relational database management system, on a content-addressed storage device, on an external storage area, or in any other logical way. In some embodiments, when a content server receives a command to initiate automatic elevation of system security (e.g., from a system administrator) the content server automatically performs configuration steps to create certificate-authenticated communications between the content server and other associated content servers, docbrokers, and client systems. In some embodiments, the content server distributes certificates or collections of certificates (e.g., trust stores or key stores) to associated systems to enable elevation of system security.

In some embodiments, the Docbroker is like a nameserver. When a client wants to find out available servers for a docbase, it looks up the servers in Docbroker's ServerMap. Once the clients get details of the server, then they directly connect to the server for rest of their other operations. This is similar to a DNS lookup. In some embodiments, Content Servers do not directly talk to one other on the network. If Content Server 1, for instance, has to do configuration changes to Content Server 2, it goes to the database directly, looks up Content Server 2's configuration object and updates it. This will be picked up Content Server 2 in a configured amount of time (called change checker interval) and on detecting the update, Content Server 2 will reinitialize itself using the new configuration.

Figure 3:
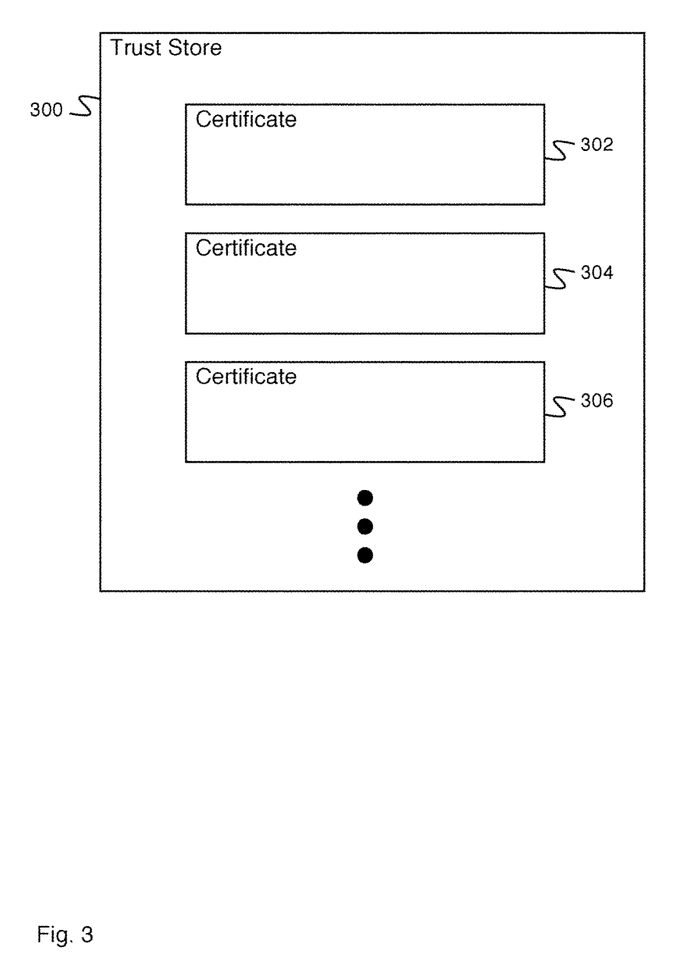
FIG. 3 is a block diagram illustrating an embodiment of a trust store.

FIG. 3 is a block diagram illustrating an embodiment of a trust store. In some embodiments, a trust store is created and distributed by a content server as part of a process to enable elevation of system security. In the example shown, trust store 300 comprises certificate 302, certificate 304, and certificate 306. In various embodiments, trust store 300 comprises, 1, 3, 12, 34, 178, or any other appropriate number of certificates. In some embodiments, certificate 302, certificate 304, and certificate 306 each comprise an authentication certificate for authenticating communication between a content server and a docbroker. In some embodiments, the trust store is distributed to content servers as part of a process to enable elevation of system security. In some embodiments, the trust store or truststore comprises a cabinet/file containing a collection of certificates, where there is no password required for this file. In some embodiments, PKCS#7 (e.g., public-key cryptography standard #7) is used for the format for the trust store.

Figure 4:
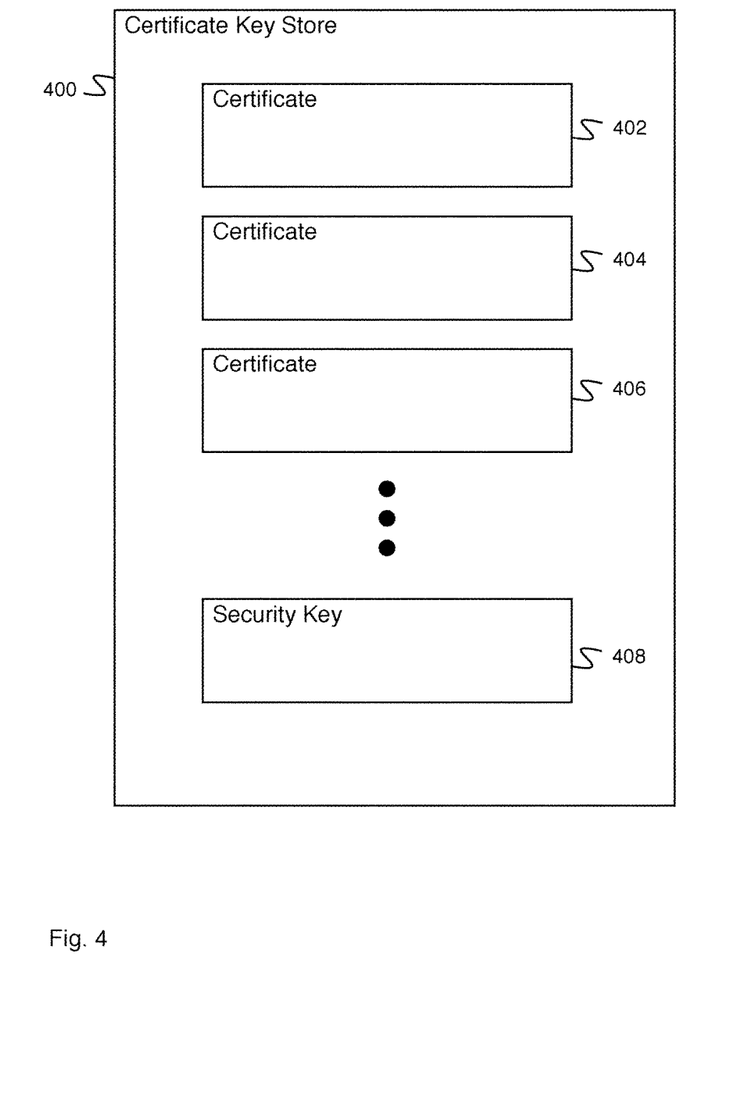
FIG. 4 is a block diagram illustrating an embodiment of a key store.

FIG. 4 is a block diagram illustrating an embodiment of a key store. In some embodiments, a key store is created and distributed by a content server as part of a process to enable elevation of system security. In the example shown, key store 400 comprises certificate 402, certificate 404, and certificate 406. In various embodiments, key store 400 comprises 1, 4, 22, 144, 783, or any other appropriate number of certificates. In some embodiments, certificate 402, certificate 404, and certificate 406 each comprise an authentication certificate for authenticating communication between two content servers. Key store 400 additionally comprises security key 408. Key store 400 comprises an encrypted collection of certificates, with security key 408 the required security key to decrypt the key store. In some embodiments, the key store is distributed to content servers, docbrokers, and client APIs as part of a process to enable elevation of system security. In some embodiments, the key store or key store comprises a cabinet/file containing a collection of certificates along with a private key, where there is a password required for this file to prevent unauthorized access to the private key. In some embodiments, PKCS#12 (e.g., public-key cryptography standard #12) & JKS (e.g., java key store) is used for the format for the key store.

In some embodiments, there are many advantages using PKCS#7 and PKCS#12 formats: 1. They are the standard widely used formats; 2. When customer request for Certificates, these are formats that most Certificate Authorities issue them; 3. PKCS#12 has its own password and hence is secure; 4. These formats are platform independent; 5. These are in binary format and hence cannot be easily tampered with w/o causing corruption; 6. Can be used by C++ and other native libraries including Java libraries. Java key store has most of these benefits, except that it is restricted to Java code and C++ natively cannot use them.

In some embodiments, a key store can act as a trust store.

In some embodiments, a content server has configuration settings in a <server>.ini file:
  Keystore_file=<store containing server certificate & private key>
  Keystore_pwd_file=<path to file having encrypted keystore password>
  Truststore_file=<store having trusted docbroker certificates>

In some embodiments, a docbroker has configuration settings in a <docbroker>.ini file:
  Keystore_file=<keystore containing docbroker certificate & private key>
  Keystore_pwd_file=<path to file having encrypted keystore password>

In some embodiments, a client DFC has configuration settings:
  dfc.security.ssl.truststore—path to the truststore containing certificates for server and docbroker
  dfc.security.ssl.trust_storepassword—password of the truststore, should be encrypted
  dfc.security.ssl.use_existing_truststore—should use the existing keystore or not In some embodiments, options for certificate creation include: expiry date (e.g., 1 year), key algorithm (e.g., RSA, sometimes fixed), key length (e.g., 2048), organizational unit (e.g., DCTM), organization (e.g., a company name), a state (e.g., CA), a province (e.g., PLE), a common name (e.g., broker/CS name, sometimes derived from system), and email address (e.g., support@emc.com).

Figure 5:
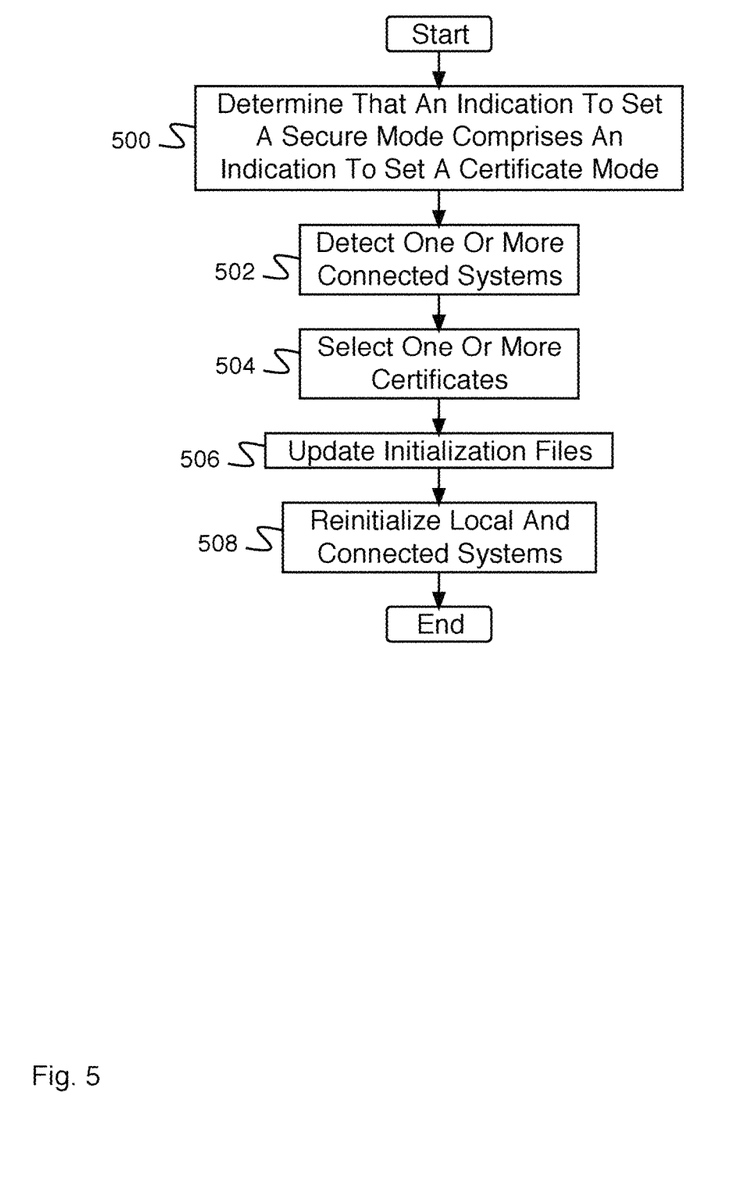
FIG. 5 is a flow diagram illustrating an embodiment of a process for automatic elevation of system security.

FIG. 5 is a flow diagram illustrating an embodiment of a process for automatic elevation of system security. In some embodiments, the process of FIG. 5 is executed by a content server (e.g., content server 210 of FIG. 2). In the example shown, in 500, the server determines that an indication to set a secure mode comprises an indication to set a certificate mode (e.g., a mode where secure communications are authenticated using certificates). In some embodiments, the indication to set a secure mode comprises an indication sent to the server by a system administrator (e.g., the system administrator indicates to the server to set a certificate mode). In 502, one or more connected systems are detected. In various embodiments, one or more connected systems comprise other content servers, docbrokers, client systems, databases, or any other appropriate systems. In 504, one or more certificates are selected. In some embodiments, selecting certificates comprises selecting certificates that exist on the content server (e.g., previously generated certificates or certificates received from connected systems). In some embodiments, selecting certificates comprises generating new certificates. In some embodiments, one certificate is selected corresponding to each connected system detected in 502. In some embodiments, selecting one or more certificates additionally comprises packaging certificates into a trust store. In some embodiments, selecting one or more certificates additionally comprises packaging certificates into a key store. In 506, initialization files are updated. In various embodiments, initialization files are updated on content servers, on docbrokers, on client systems, or on any other appropriate systems. In 508, local and connected systems are reinitialized.

Figure 6:
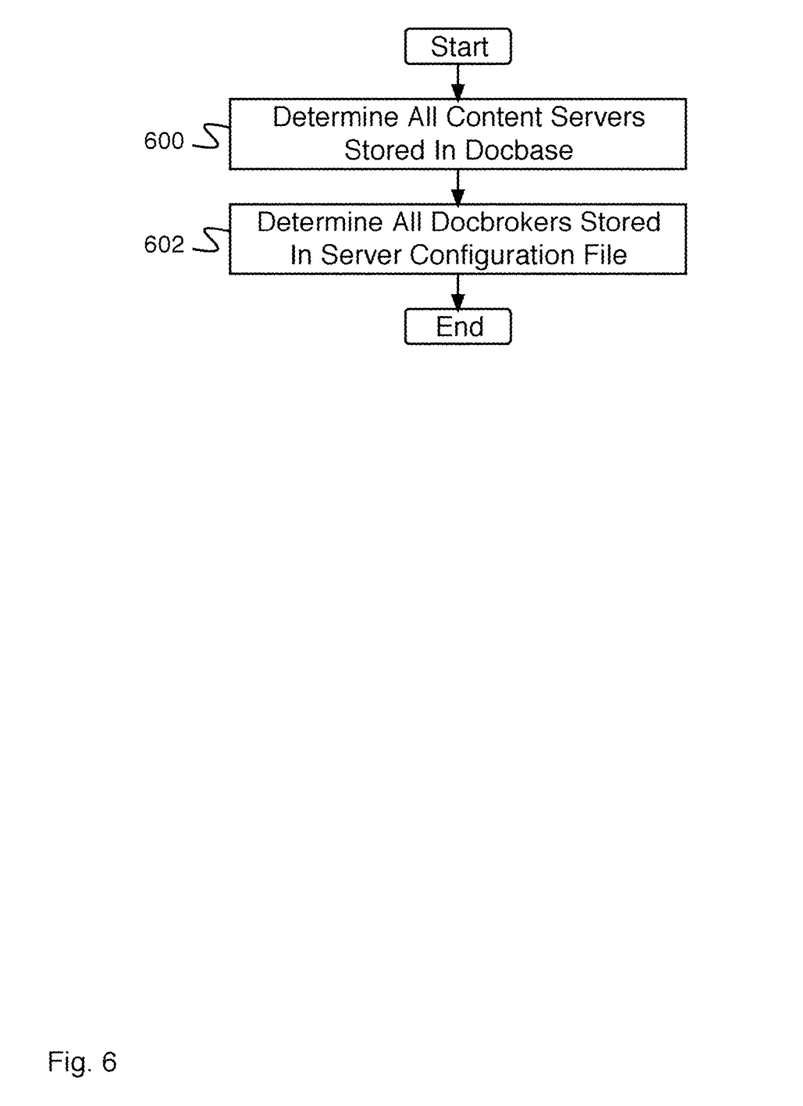
FIG. 6 is a flow diagram illustrating an embodiment of a process for detecting one or more connected systems.

FIG. 6 is a flow diagram illustrating an embodiment of a process for detecting one or more connected systems. In some embodiments, the process of FIG. 6 implements 502 of FIG. 5. In the example shown, in 600, all content servers stored in the docbase are determined. In some embodiments, the docbase comprises a database stored on a content server of other content servers the content server is in communication with. In 602, all docbrokers stored in the server configuration file are determined. In some embodiments, the server configuration file comprises a server initialization file. In some embodiments, docbrokers the server is projecting to are also determined.

Figure 7:
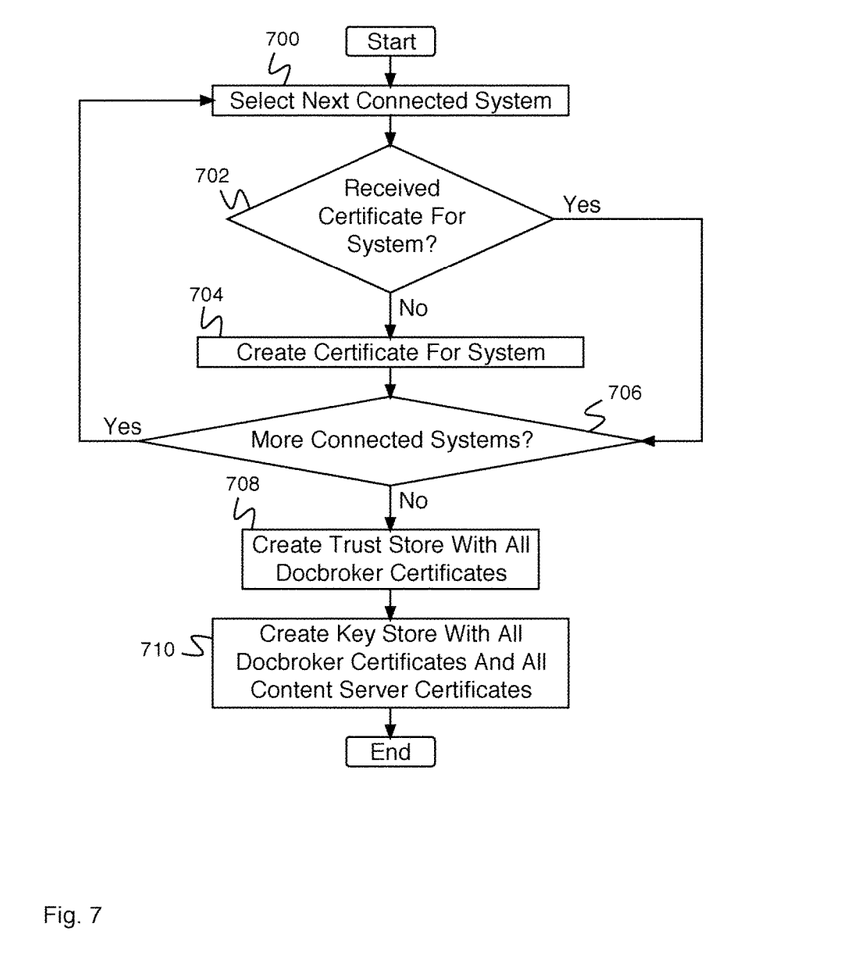
FIG. 7 is a flow diagram illustrating an embodiment of a process for selecting one or more certificates.

FIG. 7 is a flow diagram illustrating an embodiment of a process for selecting one or more certificates. In some embodiments, the process of FIG. 7 implements 504 of FIG. 5. In the example shown, in 700, the next connected system (e.g., the next connected system of the connected systems determined in 502) is selected. In some embodiments, the next connected system comprises the first connected system. In 702, it is determined whether a certificate for the system has been received. In some embodiments, it is determined whether a certificate for the system has been created previously (e.g., whether a certificate for the system is already present). In the event a certificate for the system has been received, control passes to 706. In the event a certificate for the system has not been received, control passes to 704. In 704, a certificate for the system is created. For example, a certificate is generated with a key with a specific length. In 706, it is determined whether there are more connected systems. In the event there are more connected systems, control passes to 700. In the event there are not more connected systems, control passes to 708. In 708, a trust store (e.g., a trust store as shown in FIG. 3) is created with all docbroker certificates (e.g., certificates corresponding to docbrokers). In 710, a key store (e.g., a key store as shown in FIG. 4) is created with all docbroker certificates and all content server certificates (e.g., certificates corresponding to content servers).

Figure 8:
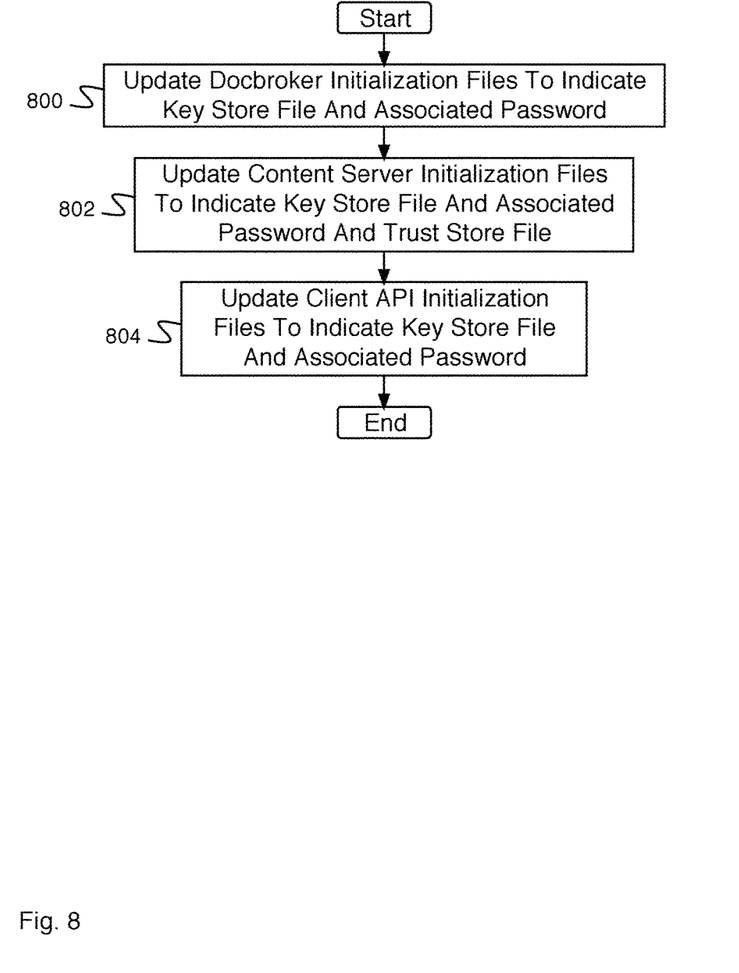
FIG. 8 is a flow diagram illustrating an embodiment of a process for updating initialization files.

FIG. 8 is a flow diagram illustrating an embodiment of a process for updating initialization files. In some embodiments, the process of FIG. 8 implements 506 of FIG. 5. In the example shown, in 800, docbroker initialization files are updated to indicate a key store file (e.g., the key store file created in 710 of FIG. 7) and associated password. In 802, content server initialization files are updated to indicate the key store file and associated password and a trust store file (e.g., the trust store file created in 708 of FIG. 7). In 804, client API initialization files are updated to indicate the key store file and associated password.

Figure 9:
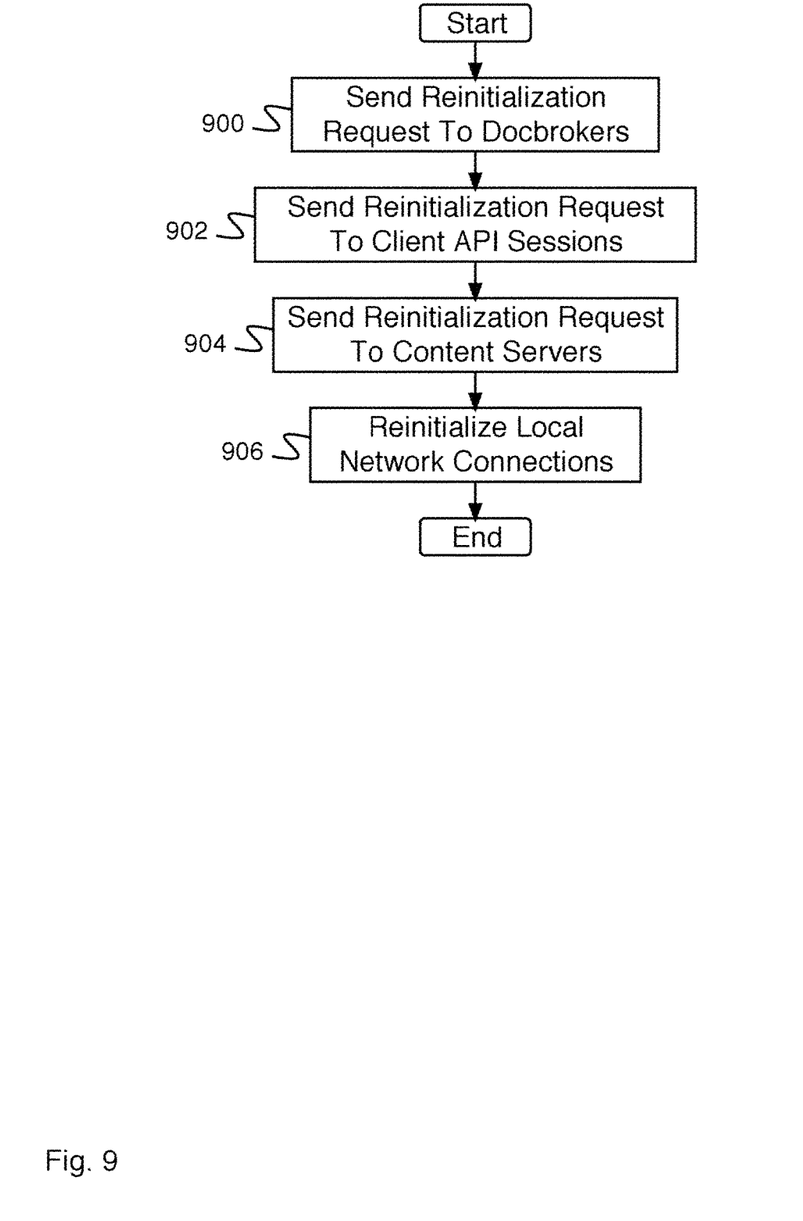
FIG. 9 is a flow diagram illustrating an embodiment of a process for reinitializing local and connected systems.

FIG. 9 is a flow diagram illustrating an embodiment of a process for reinitializing local and connected systems. In some embodiments, the process of FIG. 9 implements 508 of FIG. 5. In the example shown, in 900, a reinitialization request is sent to docbrokers (e.g., docbrokers identified in 602 of FIG. 6). For example, the reinitialization request indicates to reinitialize the communication with other systems using the certificates as stored on the system. In 902, a reinitialization request is sent to client API sessions (e.g., to any clients communicating with the content server). In 904, a reinitialization request is sent to content servers (e.g., content servers identified in 600 of FIG. 6). For example, the reinitialization request indicates to reinitialize the communication with other systems using the certificates as stored on the system. In 906, local network connections (e.g., network connections of the content server) are reinitialized.

Figure 10:
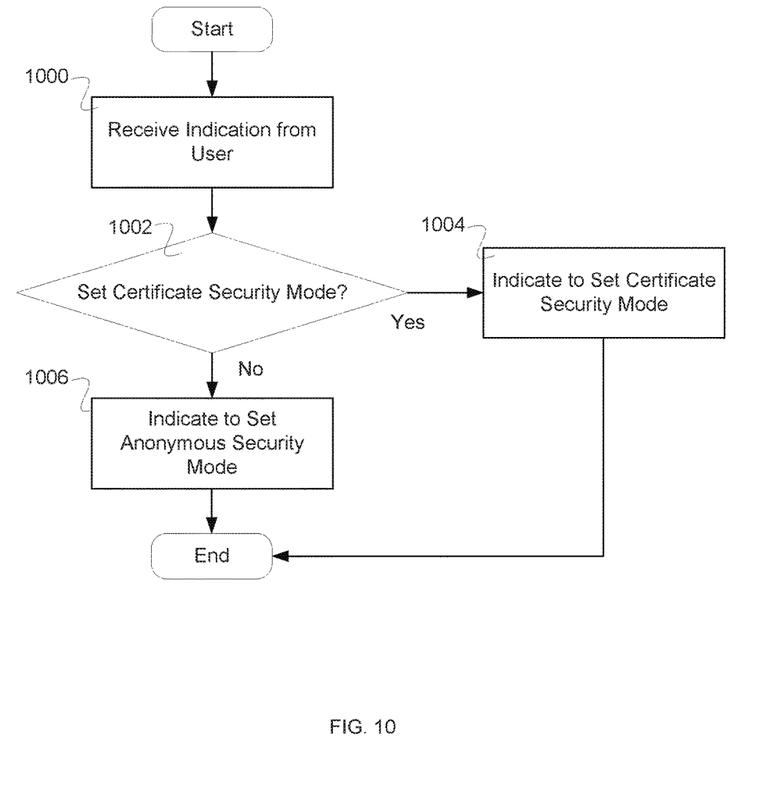
FIG. 10 is a flow diagram illustrating an embodiment of a process for automatic setting of security level.

FIG. 10 is a flow diagram illustrating an embodiment of a process for automatic setting of security level. In the example shown, in 1000 an indication is received from a user. For example, an administrator sets security level using a SET_SECURITY_LEVEL command. In 1002, it is determined whether the certificate security mode is set. In the event that the certificate security mode is set, in 1004 it is indicated to set certificate security mode. In the certificate security mode, the system will automatically start using certificates when communicating between components of the system. In the event that the certificate security mode is not set, in 1006 it is indicated to set anonymous security mode. In the anonymous security mode, the system will automatically start using anonymous secure sockets layer (SSL) when communicating between components of the system.

Figure 11:
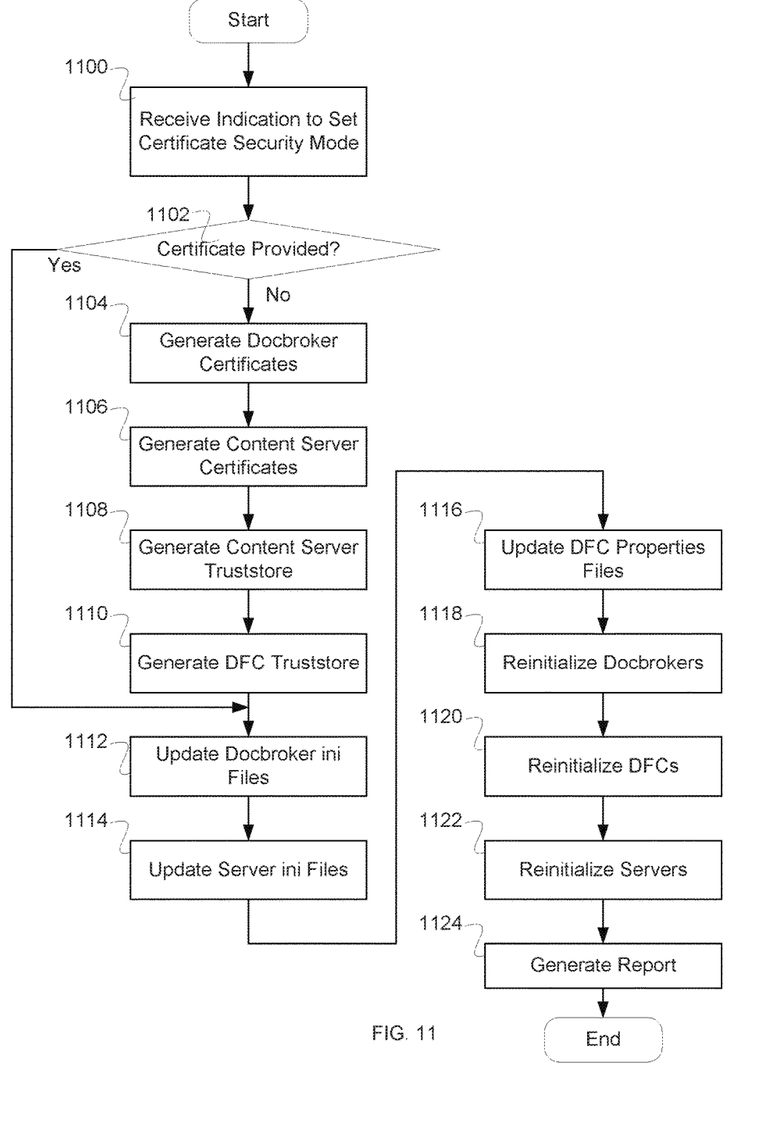
FIG. 11 is a flow diagram illustrating an embodiment of a process for automatic setting of security level.

FIG. 11 is a flow diagram illustrating an embodiment of a process for automatic setting of security level. In the example shown, in 1100 an indication is received to set certificate security mode. In 1102 it is determined whether a certificate is provided. In the event that a certificate is provided, control passes to 1112. For example, an indication of a certificate can be provided by specifying DOCBROKER, <docbroker Name>, certificatefile name, certificate password file; SERVER, <server_config name>, certificate file name, certificate password file, truststore file name; and/or DFC, <path to dfc.preperties>, dey store path name, key store password. In the event that a certificate is not provided, in 1104, docbroker certificates are generated. For example, a certificate is created for each of the docbrokers configured in the server.ini and to which the server is projecting to. In 1106, content server certificates are generated. For example, a certificate for the content server itself is created and for each of the other server config objects stored in the docbase. In 1108, content server truststore is generated. For example, a truststore is created which will have all the docbroker certificates. In 1110, a DFC truststore is generated. For example, a DFC keystore is created which will have all the docbroker certificates and all server_config certificates. In 1112, docbroker ini files are updated. For example, the docbroker.ini files are updated for each of the docbrokers to set the details regarding the certificate file (e.g., a P12 file) and the password file (e.g., a P12 password file). In 1114, server ini files are updated. For example, the server<server>.ini files are updated for each of the server_config to set the details regarding the certificate file (e.g., a P12 file) and the password file (e.g., a P12 password file) and the docbroker trust file. In 1116, DFC properties files are updated. For example, the dfc.properties file is updated to point to the dfc.keystore and password. In 1118, docbrokers are reinitialized. For example, a docbroker is sent to do a reinit. This is similar to a checkpoint request. Upon receiving this, the docbroker will do a netwise connection remit with the parameters set in the docbroker.ini. In 1120 DFCs are reinitialized. For example, a DFC request is sent to all connected DFC sessions. This is an out-of-band data which the DFC client gets and does a network reinit. In 1122, servers are reinitialized. For example, the docbase property is modified to indicate to other server server_config's to do a reinit. This is similar to how a dormancy state is broadcast. The local server is reinitialized for its network connections. This reads the configuration from the updated server-, server_config>.ini. In 1124, a report is generated. For example, the report includes a description of the prior configuration listing security levels and configurations, results of the update operation, and resulting configuration once the reinit is complete.

Figure 12:
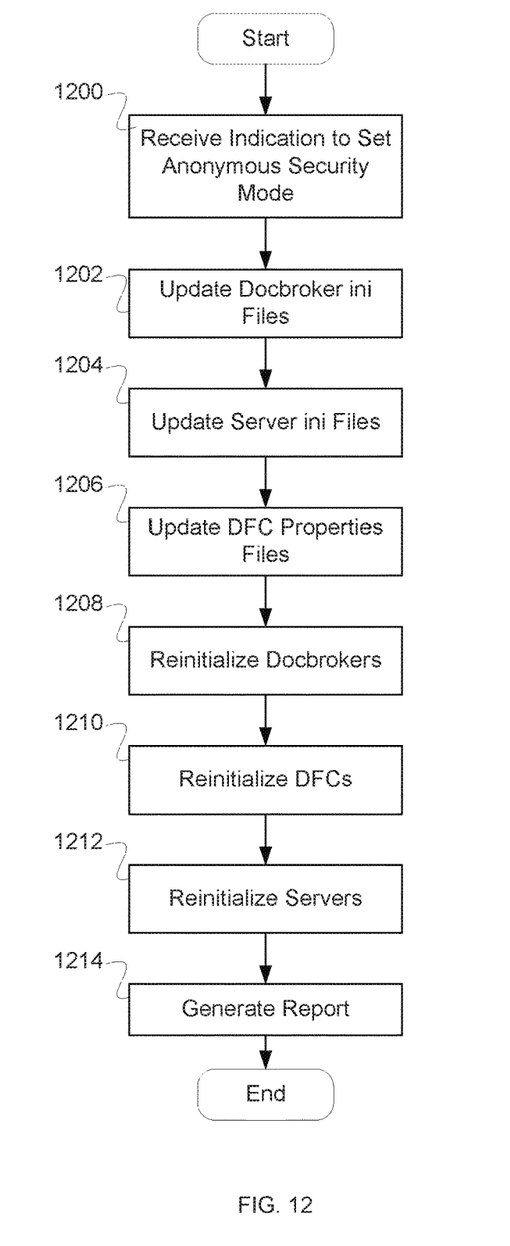
FIG. 12 is a flow diagram illustrating an embodiment of a process for automatic setting of security level.

FIG. 12 is a flow diagram illustrating an embodiment of a process for automatic setting of security level. In some embodiments, the system (e.g., the content server) does the opposite of the process in FIG. 11 where it comments out the settings referring to certificates and its settings. In the example shown, in 1200 an indication is received to set anonymous security mode. In 1202, docbroker ini files are updated. For example, the docbroker.ini files are updated for each of the docbrokers to set the details regarding not using the certificate file (e.g., a P12 file) and the password file (e.g., a P12 password file). In 1204, server ini files are updated. For example, the server<server>.ini files are updated for each of the server_config to set the details regarding not using the certificate file (e.g., a P12 file) and the password file (e.g., a P12 password file) and the docbroker trust file. In 1206, DFC properties files are updated. For example, the dfc.properties file is updated to not point to the dfc.keystore and password. In 1208, docbrokers are reinitialized. For example, a docbroker is sent to do a reinit. This is similar to a checkpoint request. Upon receiving this, the docbroker will do a netwise connection reinit with the parameters set in the docbroker.ini. In 1210 DFCs are reinitialized. For example, a DFC request is sent to all connected DFC sessions. This is an out-of-band data which the DFC client gets and does a network reinit. In 1212, servers are reinitialized. For example, the docbase property is modified to indicate to other server server_config's to do a reinit. This is similar to how a dormancy state is broadcast. The local server is reinitialized for its network connections. This reads the configuration from the updated server-, server_config>.ini. In 1214, a report is generated. For example, the report includes a description of the prior configuration listing security levels and configurations, results of the update operation, and resulting configuration once the reinit is complete.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
one or more processors configured to:
determine to set communication with the system to a secure mode;
in response to determining to set the communication with the system to the secure mode,
determine one or more certificates to use for communication with one or more connected systems in connection with the secure mode; and set the communication between the system and the one or more connected systems to the secure mode, comprising updating one or more initialization files of the system or at least one of the one or more connected systems based at least in part on the one or more selected certificates; and one or more memories coupled to the one or more processors and configured to provide the one or more processors with instructions.

2. The system of claim 1, wherein the updating the updating one or more initialization files based at least in part on the one or more selected certificates comprises updating the one or more initialization files to indicate a path to at least one of the one or more selected certificates.

3. The system of claim 1, wherein to set the set the communication between the system and the one or more connected systems to the secure mode further comprises reinitializing one or more of the system and at least one of the one or more connected systems.

4. The system of claim 3, wherein at least one of the one or more connected systems is reinitialized in response to the communication with the one or more connected system being set to the secure mode.

5. The system of claim 1, wherein the one or more processors are further configured to determine whether the one or more certificates have been received for the one or more connected systems.

6. The system of claim 1, wherein the one or more processors are further configured to detect the one or more connected systems for which to set to the secure mode.

7. The system of claim 1, wherein to set the communication with the one or more connected systems to the secure mode comprises setting a certificate-based authentication between the system and the one or more connected systems.

8. The system of claim 1, wherein to set the communication with the one or more connected systems to the secure mode comprises providing at least one of the one or more connected systems with at least one of the one or more selected certificates.

9. The system of claim 1, wherein one or more of the one or more connected systems comprise docbrokers.

10. The system of claim 1, wherein one or more of the one or more connected systems comprise content servers.

11. The system of claim 1, wherein to determine the one or more certificates comprises receiving one or more of the one or more certificates.

12. The system of claim 1, wherein to determine the one or more certificates comprises generating one or more of the one or more certificates.

13. The system of claim 1, wherein the one or more processors are further configured to create a trust store.

14. The system of claim 1, wherein the one or more processors are further configured to create a key store.

15. The system of claim 1, wherein the one or more processors are further configured to, in response to a determination to set communication with one or more connected systems to a secure mode comprises an indication to not set a certificate mode:
determine at least one of the one or more connected systems for which to set to the anonymous mode;
update initialization files for the anonymous mode; and
reinitialize local and at least one of the one or more connected systems.

16. The system of claim 1, wherein the one or more processors are further configured to determine whether at least one of the one or more selected certificates has been previously created, and in response to a determination that the at least one of the one or more selected certificates has not been previously created, creating the at least one of the one or more certificates.

17. A method, comprising:
determining to set communication with the system to a secure mode; and
in response to determining to set the communication with the system to the secure mode,
determining one or more certificates to use for communication with one or more connected systems in connection with the secure mode; and
setting the communication between the system and the one or more connected systems to the secure mode, comprising updating one or more initialization files of the system or at least one of the one or more connected systems based at least in part on the one or more selected certificates.

18. A computer program product, the computer program product being embodied in a non-transitory computer readable storage medium and comprising computer instructions for:
determining to set communication with the system to a secure mode; and
in response to determining to set the communication with the system to the secure mode,
determining one or more certificates to use for communication with one or more connected systems in connection with the secure mode; and
setting the communication between the system and the one or more connected systems to the secure mode, comprising updating one or more initialization files of the system or at least one of the one or more connected systems based at least in part on the one or more selected certificates.

* * * * *

UNITED STATES PATENT AND TRADEMARK OFFICE
CERTIFICATE OF CORRECTION

| | |
|---|---|
| PATENT NO. | : 10,491,406 B2 |
| APPLICATION NO. | : 16/124012 |
| DATED | : November 26, 2019 |
| INVENTOR(S) | : Raghavendra Anantha Rao |

It is certified that error appears in the above-identified patent and that said Letters Patent is hereby corrected as shown below:

In the Specification

In Column 8, Line(s) 2, delete "remit" and insert --reinit--, therefor.

In the Claims

In Column 9, Line(s) 10 & 11, Claim 2, delete "the updating the updating" and insert --updating the--, therefor.

In Column 9, Line(s) 15, Claim 3, delete "set the set the" and insert --set the--, therefor.

Signed and Sealed this
Thirtieth Day of June, 2020

Andrei Iancu
*Director of the United States Patent and Trademark Office*